United States Patent [19]

Greethead

[11] Patent Number: 4,478,862
[45] Date of Patent: Oct. 23, 1984

[54] HEAT-TREATMENT OF CEREAL

[75] Inventor: Geoffrey F. Greethead, Killara, Australia

[73] Assignee: Geoffrey Greethead Pty. Limited, Killara, Australia

[21] Appl. No.: 342,638

[22] Filed: Jan. 26, 1982

[30] Foreign Application Priority Data

Feb. 26, 1981 [AU] Australia .............................. PE7764

[51] Int. Cl.³ .......................... A23L 1/10; A23B 9/00
[52] U.S. Cl. .................................... 426/450; 34/57 E; 99/483; 426/465
[58] Field of Search ............... 426/450, 465, 462, 520, 426/618; 99/483, 474, 467; 34/57 E, 57 R

[56] References Cited

U.S. PATENT DOCUMENTS

| 904,186 | 11/1908 | Eckstein | 426/450 |
| 2,610,124 | 9/1952 | Roberts | 426/450 |
| 2,696,156 | 12/1954 | Campbell et al. | 426/450 |
| 2,808,333 | 10/1957 | Mickus et al. | 426/450 |
| 2,992,921 | 7/1961 | Bardet et al. | 426/465 |
| 3,256,614 | 6/1966 | Dunbar | 34/57 R |
| 3,661,071 | 5/1972 | Toei et al. | 426/450 |
| 3,674,514 | 7/1972 | Satake | 99/355 |
| 3,812,595 | 5/1974 | Engelhart et al. | 34/57 R |
| 3,881,861 | 5/1975 | Ritzmann | 34/57 R |
| 4,119,396 | 10/1978 | Abelitis et al. | 34/57 R |

FOREIGN PATENT DOCUMENTS

| 242588 | 1/1963 | Australia . |
| 244945 | 1/1963 | Australia . |
| 3038033 | 4/1981 | Fed. Rep. of Germany . |
| 814756 | 6/1959 | United Kingdom . |

Primary Examiner—George Yeung
Attorney, Agent, or Firm—Ladas & Parry

[57] ABSTRACT

A method for rapidly heat treating a cereal such as rice in at least two cyclones wherein the cereal is contacted for 10 to 15 seconds with hot gas at a temperature of 400° to 600° C. Substantially all the heat treatment occurs in the cyclones which provide conditions of extreme turbulence enabling the vaporization of water in the cereal to produce a substantially uniform microporous product. Quick cooking rice cookable in about six minutes may be produced very economically.

7 Claims, 4 Drawing Figures

HEAT-TREATMENT OF CEREAL

FIELD OF THE INVENTION

The present invention relates to an apparatus for the treatment of a cereal by contacting it with gas at a high temperature for a short period of time so as to rapidly remove water and produce a micro-porous product.

The treatment is particularly suitable for treating unmilled, milled or polished rice; and may be carried out on uncooked, partially cooked or gelatinised rice. The treated rice so produced is a quick cooking rice which requires substantially less cooking time than ordinary untreated rice, generally around six minutes.

BACKGROUND OF THE INVENTION

There is increasingly a consumer demand for food products which may be prepared quickly and with guaranteed results. There are on the market a number of quick cooking rice products whose cooking time is substantially lower than that of ordinary rice. In general, this is achieved by precooking the rice. The precooking step results in the absorption of water by the rice so that its moisture content rises from around 12% to 14% by weight for uncooked rice to around 60% by weight. It is then necessary to remove this absorbed water so as to bring the moisture content back to its original level. This drying step must be carried out carefully in order to avoid tainting the rice and is usually achieved by heating or freeze drying.

Often, the speed of subsequent cooking of the treated rice is enhanced by breaking up the granule structure, for example by puffing the cooked grain, flattening between rollers, freeze drying or freezing and thawing.

The main quick cooking rice products currently on the market are produced as follows. "Minute Rice" (General Foods) is produced by sequentially cooking, draining, granulating, drying, rolling and further drying. "Quick Rice" (Uncle Bens) is produced by sequentially cooking, draining, freezing, thawing, and drying. Other commercial products are produced by sequentially cooking, draining, drying, granulating, rolling and drying. Freeze drying is an expensive technique but is used in certain applications, notably for army field rations, calling for reconstitution simply by the addition of water.

However, since all these processes involve a cooking step and a subsequent drying step, they require a high energy input and the product is consequently expensive. Moreover, specialised expensive apparatus is generally required.

Australian patent specification No. 244,945 proposes the production of a quick cooking rice by contacting the rice with air at a temperature of 205° to 315° C. for a short time of 10 to 40 seconds. The apparatus used in this proposal is described in Australian patent specification No. 242,588. In fact, it seems that this process has never been put into commercial use. Experiments show that rice treated as described in these patents is unsuitable for use since the rice is not treated homogeneously, some rice being undertreated and other rice being scorched.

U.S. patent specification No. 2,992,921 describes an apparatus for heat treating brown rice in a fluidised bed. The rice is fed onto a perforated belt which is indexed under a conical chimney and hot air passed through the perforations to lift the rice off the belt. After a short time, the hot air is interrupted, the rice falls back onto the belt and the belt is indexed under a further chimney. Here cold air is passed through the rice. Not only is this apparatus complex with a large number of moving parts but it is found that the rice so treated shows unacceptable variations in the degree of heat treatment.

The present invention seeks to mitigate these disadvantages.

SUMMARY OF THE INVENTION

The present invention provides an apparatus for rapidly heat treating a cereal in a stream of hot gas under homogenous heating conditions, which comprises
 a furnace having an outlet for delivering a stream of hot gas,
 at least one cyclone having at an upper end an inlet for hot gas and cereal connected by a hot gas duct to the furnace outlet, a gas outlet, and a treated cereal outlet at a lower end thereof,
 introduction means for introducing cereal into the hot gas stream in the duct;
 the arrangement being such that cereal entrained in the hot gas is heat treated by contact with the gas prior to being separated therefrom,
 substantially the whole of the heat treatment being carried in the cyclone(s).

The cyclone provides conditions of extreme turbulence leading to production of a very uniform heat-treated cereal.

Generally, in order to achieve the correct treatment times, two or more cyclones arranged in series will be provided and it is advantageous that cereal leaving a cyclone be entrained in a stream of fresh hot gas to transport it into the subsequent cyclone, so as to keep the cereal at a high temperature. Thus, the cereral outlet of a cyclone will usually be connected into further introduction means for feeding the cereal into a further duct leading directly from the furnace to the inlet of the subsequent cyclone.

Preferably, the gas outlet of one or more of the cyclones is connected for recycling the gas to the furnace so as to conserve heat. A vent will usually be provided for venting a portion of the total amount of used gas.

A variety of introducing means may be employed for introducing the cereal into the gas stream, including screw transport means such as an auger, or a rotary hopper. A venturi arranged to suck cereal into the hot gas duct by pressure reduction is preferred since it has no moving parts.

The invention in a further aspect provides a method of heat-treating a cereal.

Generally, the treatment comprises rapidly heating the cereal to a temperature of from 100° to 600° C., preferably 400° to 600° C. for a time of from 2 to 30 seconds, preferably 10 to 15 seconds, so as to vapourise water in the cereal and produce a substantially uniform microporous product.

The rapid short-duration heating causes water to be rapidly evolved as steam. This renders the product microporous and reduces the moisture content, for example rice is dried usually down to 6 to 8 weight %. However, if desired water may be added to the treated cereal so as to restore its water content to the original level prior to sale.

A quick cooking milled rice so produced may generally be cooked in about 6 minutes in boiling water, is microporous and generally has a density of below 0.6 g/ml. Untreated milled rice requires from 18 to 20 minutes cooking time and has a density in the region 0.80 to 0.85 g/ml. The present invention may be applied to all kinds of rice including brown rice, long grain rice, short grain rice and glutinous rice. After treatment according to the present invention, the density of long grain rice is generally in the region 0.3 to 0.6 g/ml, particularly 0.45 to 0.55 g/ml. After treatment short grain rice generally has a density of 0.30 to 0.50 g/ml, particularly 0.35 to 0.45 g/ml.

The quick cooking rice may also be employed in the production of gelatinised rice, e.g. for use in making puffed rice bubbles. Normally, prior to puffing, rice is cooked under pressure (e.g. 15 psi) for 60–90 minutes with steam and some water to give a gelatinised product of relatively low water content (e.g. 30 wt %). This product is then puffed. However, the quick cooking rice of the present invention can be gelatinised under the same conditions in less than 20 minutes. It has also been found possible to conduct the gelatinisation at atmospheric pressure.

It will be appreciated that a considerable saving in energy results from the fact that according to the present invention it is unnecessary to precook rice in boiling water. However, for certain applications a certain degree of precooking may be desirable.

Depending upon the operating conditions, the rice is generally in a non-gelatinised form such that the rice still exhibits the starch granule structure of uncooked rice and still polarises light. It has been observed that rice treated according to the present invention produces substantially no free starch when cooked. Moreover, the rice is tolerant of poor cooking techniques and can stand considerable overcooking.

The rice treated may be unmilled rice, milled rice or polished rice. When applied to unmilled rice, the treatment tends to assist dehusking by loosening the husk.

The rapid heating step may be carried out by contacting the rice with hot gas, having a temperature of from 100° to 600° C. The furnace may be a combustion furnace, electrical furnace or any other means of producing a hot gas stream directly or indirectly. One form of indirect heating would comprise a so-called hulls furnace wherein rice hulls were combusted. The flue gas would be used to heat the gas stream indirectly in a heat exchanger. The furnace preferably comprises a gas-air burner for directly producing a taint-free stream of hot flue gas for entraining the cereal.

After heating, it is preferred that the rice be rapidly cooled so as to stabilise the moisture content and the flavour. This may be achieved by quickly cooling in from 0.5 to 10 seconds down to a temperature of 30° to 70° C. Subsequent cooling to room temperature may then be carried out more slowly.

The apparatus of the present invention produces cereal heat treated to a high uniformity. This is believed to be due to the extreme agitation which occurs in the cyclones.

Of course, cyclones have been used for separating heat treated cereal from gaseous flows (see for example, U.S. patent specification No. 3,661,071). However, in the present apparatus the cyclones are employed for substantially the whole of the heat treatment time and have unexpectedly been found to impart a sufficiently high degree of agitation to allow uniform heat treatment. Furthermore, the capacity of the cyclones of the present invention greatly exceeds the capacity required for simple separation purposes.

Thus, advantages of preferred embodiments of the present invention include:

1. The absence of complex mechanical arrangements for conveying, exposing and cooling the grain or cereal.

The hot air used for treatment of the grain is also used to convey it through the ducts and treatment chambers. The cyclones are not designed primarily to remove the grain from the hot air stream.

They are designed and sized so that typically about 85% of the total exposure of the grain to the hot air occurs in the cyclone chamber. The only moving parts generally required are an air blower supplying a gas burner, and a main blower at the end of the hot air furnace. These components are very simple to construct and require minimal maintenance.

2. The present apparatus is able to work with much higher air velocities than is possible for prior art fluidised bed systems (the grain would be blown out of the fluidised bed at the linear velocities used in the present system). This enables the use of a much greater ratio of air mass to grain mass thus providing more efficient and more rapid heat transfer from hot air to grain.

3. The excellent exposure and agitation of the grain provided in the present apparatus enables use of very high air temperatures and short exposure times.

4. The simplicity of the present apparatus makes it cheap and simple to construct.

5. Recirculation of the hot gas for reheating is easily accomplished thus leading to reduced fuel bills. The air flow may be held in balance, it only being required to bleed to atmosphere sufficient spent air to accommodate the fresh air needed to supply the gas burner.

6. The entire installation may be fully insulated so that there are no heat losses caused by continuous extraction of heat, such as in the prior art from moving metal parts as they index through the cooling, discharge and loading steps.

DESCRIPTION OF PREFERRED EMBODIMENTS

Figure 1:
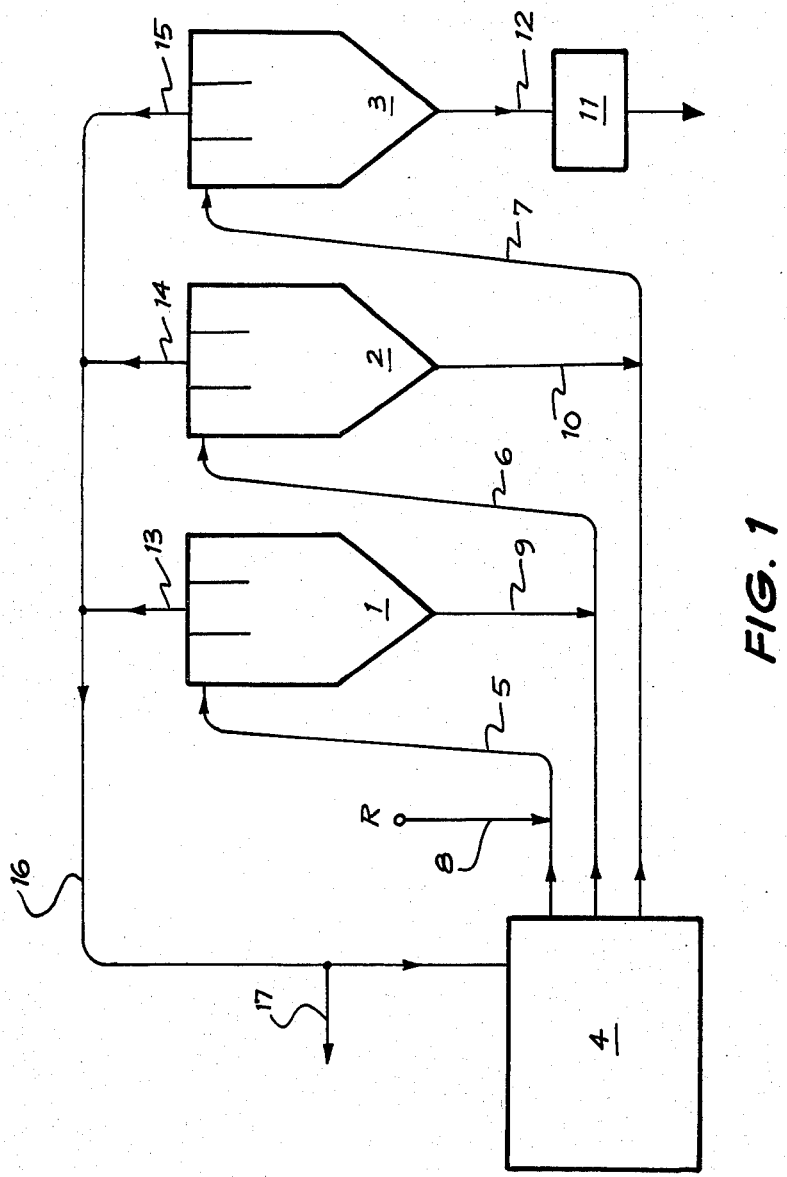
Figure 2:
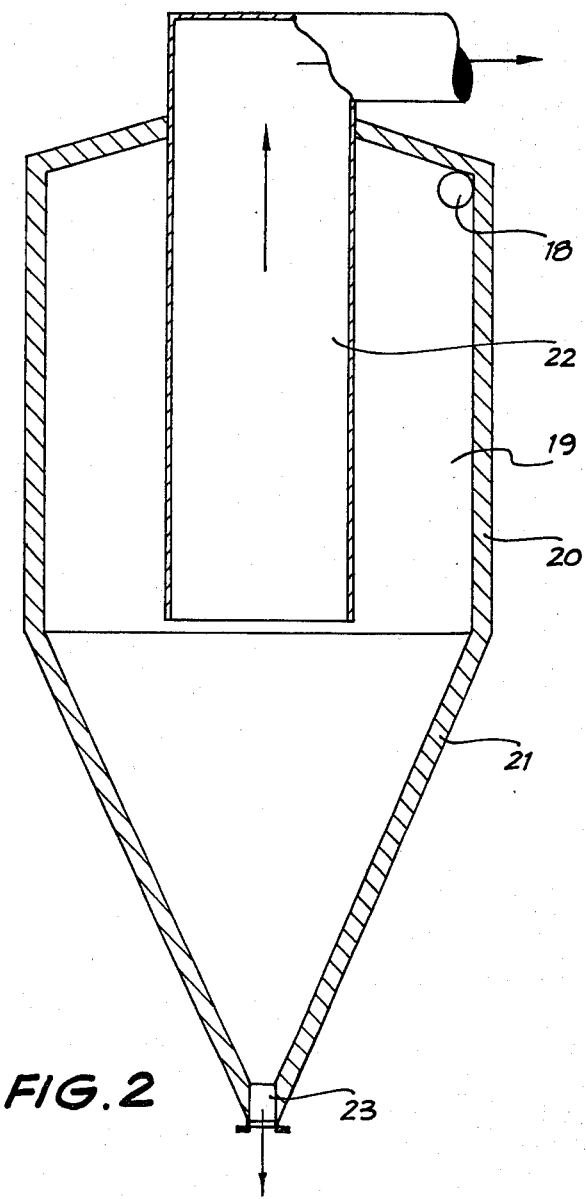
Figure 3:
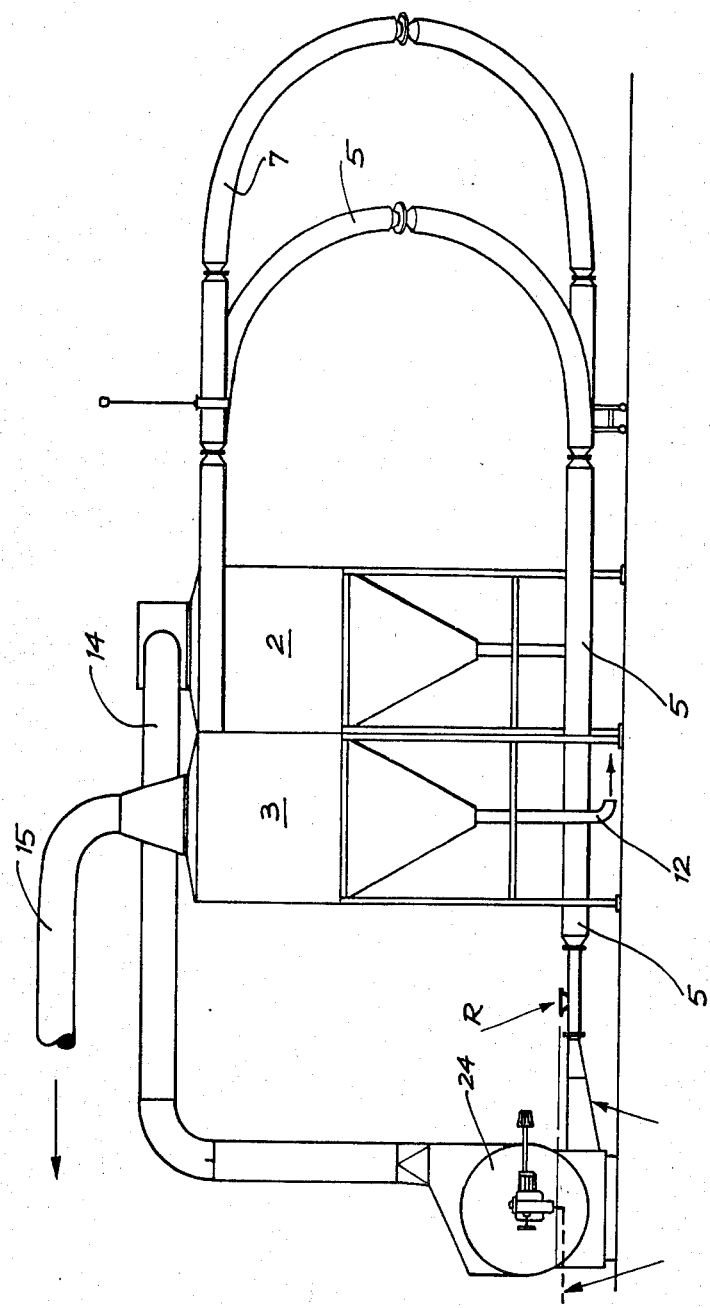
Figure 4:
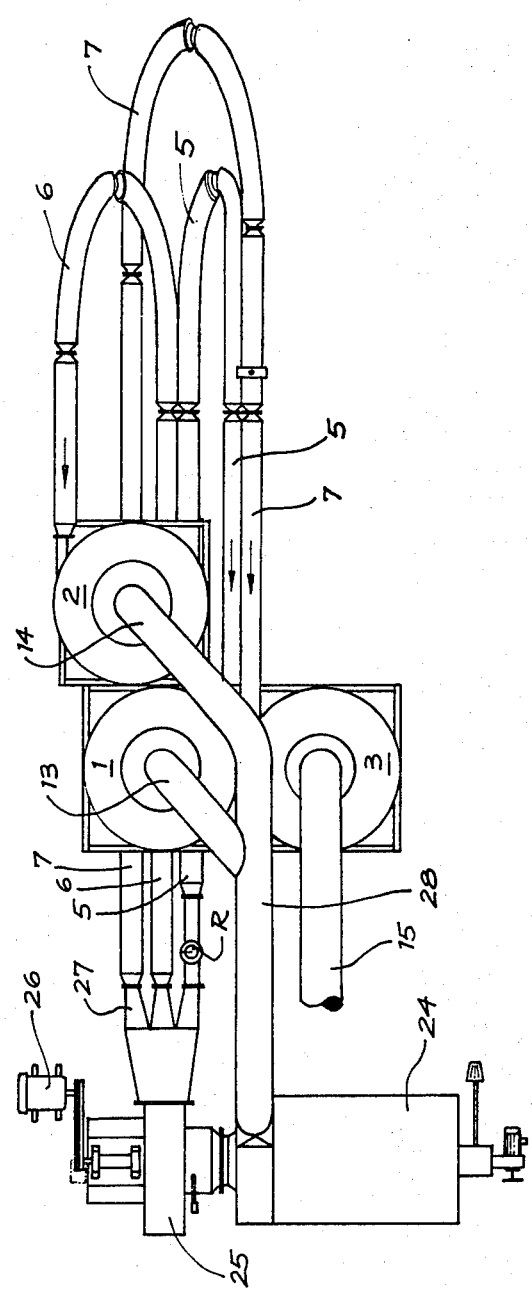

Embodiments of the invention will now be described by way of example with reference to the drawings, wherein FIG. 1 is a schematic diagram of a first embodiment, FIG. 2 is a cross-sectional elevation of a cyclone, FIG. 3 is a side elevation of a second embodiment, and FIG. 4 is a view of the second embodiment from above.

The apparatus shown in FIG. 1 comprises a furnace 4 for feeding hot combustion gases to cyclones 1, 2 and 3 through respective ducts 5, 6 and 7. Untreated rice is introduced at R into duct 5 by inlet 8. The bottom of cyclone 1 is connected to duct 6 via pipe 9 and the bottom of cyclone 2 is connected to duct 7 via pipe 10. The bottom of cyclone 3 is connected to cooler 11 via pipe 12.

Each of the cyclones has a respective gas outlet pipe 13, 14 and 15 connected to a manifold 16 for returning gas to the furnace 1. A vent 17 is provided for venting a fraction of the recycled gas.

The apparatus may be operated as follows. Hot flue gases are generated in the furnace 4 and passed into the duct 5. Rice is trickled through the inlet 8 into a venturi in the duct 5 and is entrained in the high velocity stream of hot gas. The hot gas and entrained rice is then introduced into the cyclone 1 where the rice receives substantial agitated heat treatment and is finally spun out of the gas flow. The separated rice exits through pipe 9 and the hot gas is removed through outlet pipe 13. Typically the residence time of the rice in the cyclone is from 2 to 10 seconds.

The separated rice then passes through pipe 9 and is reintroduced into a further high velocity flow of gas from the furnace in duct 6 and thereafter passes to cyclone 2 where the treatment is repeated. Finally, the treated rice leaves cyclone 3 through pipe 12 and passes to the cooler 11.

In the cooler 11 the separated rice is mixed with cold air and cooled to a temperature of around 50° C. typically in 2 to 5 seconds. The warm rice then leaves the cooler 11 and is allowed to slowly cool to ambient temperature.

Hot gas leaves the cyclones through outlets 13, 14 and 15 and enters the manifold 16 and is recycled to the furnace 4. A fraction of the gas is vented at 17.

Depending on the residence time required, any number of cyclones may be employed. The use of cyclones enables the provision of an apparatus having few moving parts which is relatively cheap to construct.

If desired, the treated rice may be remoisturised by passage under a spray so as to restore the moisture content to the level of the untreated rice.

FIG. 2 shows in more detail the cyclone construction. The cyclone comprises a chamber 19 having an upper generally cylindrical portion 20 and a lower funnel-shaped portion 21. An inlet 18 for gas and entrained rice is directed tangentially into the top of upper chamber portion 20. A gas outlet pipe 22 extends down the centre of the chamber 19. A treated rice outlet 23 is provided at the apex of the lower chamber portion 21.

Rice entrained in the gas enters through inlet 18 and swirls around the chamber. Rice is thrown outwardly by centrifugal force towards the chamber walls and eventually drops to the bottom of the chamber, before being withdrawn via outlet 23. Gas is recirculated to the furnace through outlet pipe 22.

FIGS. 3 and 4 show a second embodiment which is very similar to the first embodiment except that no cooler is provided and that only gas from the first and second cyclones is recycled to the furnace, gas from the third cyclone being vented to atmosphere.

The furnace comprises a gas-fired burner 24. Fresh hot gas is mixed with recycled gas and fed by blower 25 operated by motor 26 into manifold 27. The manifold has three branches attached to ducts 5, 6 and 7 leading to cyclones 1, 2 and 3 respectively. Untreated rice is introduced into duct 5 at R before passing into duct 6 and passes into cyclone 2. Similarly rice from cyclone 2 is fed to cyclone 3. The residence time of the rice in the ducts is very small compared to the time spent in the cyclones.

Gas exits from cyclones 1, 2 and 3 via outlet pipes 13, 14 and 15. Outlets 13 and 14 are connected to pipe 28 for recycling the gas back to burner 24, whilst outlet pipe 15 from the third cyclone leads into the atmosphere.

Fully treated rice is collected from the bottom of the third cyclone from pipe 12.

It has been found desirable to use three cyclones arranged to sequentially treat the rice with a fresh charge of hot gas. A single cyclone generally provides an insufficiently short treatment time; attempts to remedy this by slowing the gas flow velocity result in problems in entraining the rice in the gas flow. Moreover, the rice quickly cools the gas of entrainment so that it is desirable to contact the rice with a number of charges of fresh hot gas in order to maintain the rice at the desired high treatment temperature.

The invention will now be illustrated with reference to the following Examples.

EXAMPLE 1

Milled long grain rice was contacted with hot gas from the furnace at a temperature of approximately 420° C. for 12 seconds in the apparatus shown in FIGS. 3 and 4. The initial moisture content prior to treatment was 13 weight %. The treated rice had a moisture content of 7%. The density of the untreated material was 0.82 g/ml and this was reduced to 0.50 following treatment.

The treated rice required only 6 minutes to cook but could be cooked for up to 15 minutes without any noticeable deterioration in quality. There was no detectable change in the flavour of the treated rice as compared to untreated rice cooked by conventional techniques.

EXAMPLE 2

The same procedure as described in Example 1 was applied to medium grain rice of initial density 0.87 and a moisture content of 13 wt %.

The treated product had a density of 0.56 g/ml and a moisture content of 9%. The treated rice cooked in 6 minutes and was of comparable quality to untreated rice cooked by conventional techniques.

EXAMPLE 3

The procedure of Example 1 was repeated using a fresh gas temperature of about 500° C. and a total treatment time of about 15 seconds. It was estimated that the average temperature of gas in contact with the rice would be around 300° C. Rice heat-treated to excellent uniformity was obtained.

However, the rice itself never reaches these temperatures and treated rice was found to leave the last cyclone at a temperature of around 135° C.

EXAMPLE 4

The procedure of Example 1 was repeated using long, medium and short grain brown rice.

The treated product cooked in 8 minutes, compared to a time of 40–50 minutes typically required for untreated brown rice.

I claim:

1. A method for rapidly heating a cereal containing water in a stream of hot gas under homogenous heating conditions in at least two cyclones to produce a substantially uniform microporous product, which comprises generating a stream of hot gas, entraining a cereal in the gas stream, introducing the gas and entrained cereal into a first cyclone wherein the cereal is heat treated by the hot gas, separating the cereal by centrifugal force from the gas, and removing the separated treated cereal and the gas separately from the cyclone, generating a further stream of hot gas, entraining the treated cereal from the first cyclone in the further gas stream, introducing said further gas stream and heat treated cereal into a second cyclone wherein the cereal is further heat treated by hot gas, separating the twice-treated cereal by centrifugal force from the gas, and removing the separated twice-treated cereal and the gas separately from the second cyclone; said heat treatments being sufficiently rapid to raise the temperature of the cereal to vaporize the water in said cereal to produce a substantially uniform microporous product.

2. A method according to claim 1 wherein the gas from the cyclone is reheated and recycled to the hot gas stream, a portion being vented.

3. A method according to claim 1 wherein the separated treated cereal from the second cyclone or the last cyclone is cooled in 0.5 to 10 seconds to a temperature of from 30° to 70° C.

4. A method according to claim 1 wherein the cereal is entrained in the gas stream by means of a venturi-induced pressure drop in the gas stream.

5. A method according to claim 1 wherein the temperature of the hot gas is from 400° to 600° C.

6. A method according to claim 1 wherein the cereal is in contact with the hot gas for a total time of from 2 to 30 seconds.

7. A method according to claim 1 wherein the cereal is rice which becomes dried to a moisture content of from 5 to 10 wt %.

* * * * *